Dec. 24, 1940.  A. C. GRANT  2,226,510
AIR CONDITIONING SYSTEM
Filed Aug. 6, 1937
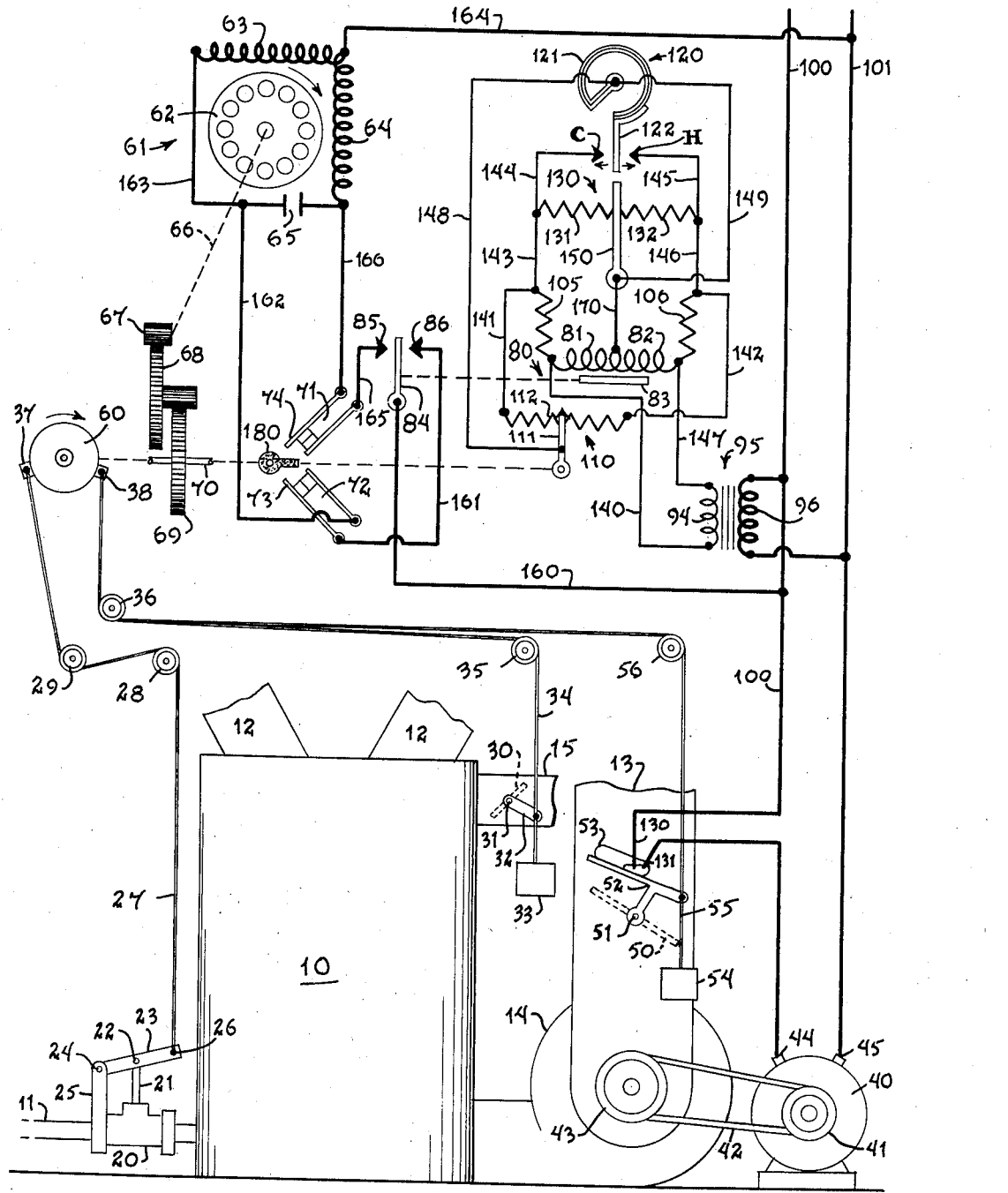
INVENTOR
*Arthur C. Grant*
BY
*George H Fisher*
ATTORNEY Patented Dec. 24, 1940

2,226,510

UNITED STATES PATENT OFFICE 2,226,510

AIR CONDITIONING SYSTEM

Arthur C. Grant, St. Paul, Minn., assignor to Minneapolis-Honeywell Regulator Company, Minneapolis, Minn., a corporation of Delaware Application August 6, 1937, Serial No. 157,716

3 Claims. (Cl. 236—11)

This invention relates to an air conditioning system and more particularly to a warm air heating system.

One of the objects of my invention is to provide an automatically controlled system for supplying air to a space to be conditioned in accordance with the requirements of the space.

Another object is to provide a warm air furnace and means automatically controlled by the requirements of a space to be heated for controlling the amount of heat supplied to the furnace.

Another object of my invention is to provide an air conditioning system wherein air is supplied to a room to be conditioned in varying amounts, and wherein a condition responsive means movable between two extreme positions is located in said room, the air supplying means being controlled by the condition responsive means to supply maximum amount of air when the condition responsive means is in one extreme position, to supply a predetermined lesser amount of air when the condition responsive means is in any intermediate position, and to supply a minimum amount of air when the condition responsive means is in the other extreme position.

Another object of my invention is to provide a warm air heating system in which air is circulated therethrough by means of a fan, there being means for varying the supply of heat to the furnace and means for varying the amount of air circulated by means of the fan, these means being controlled by a thermostat located in the space to be heated, the thermostat being movable between two extreme positions, in one of which the heat supplied to the furnace and the amount of air circulated are at a maximum, in the other extreme position the heat supplied to the furnace and the amount of air circulated are at a minimum, and when the thermostat is in any intermediate position a predetermined intermediate amount of fuel is supplied to the furnace and a predetermined intermediate amount of air is circulated, these amounts being independent of the particular intermediate position of the thermostat.

Another object is the provision of a novel control system for an electric motor.

More specifically, it is an object of my invention to provide an electric motor, a control means therefor movable between two extreme positions, in one extreme position of which the motor moves in one direction a predetermined amount, in the other extreme position of which the motor moves in the other direction a predetermined amount, and when the control member is in any intermediate position, the motor moves to a predetermined intermediate position, regardless of the particular intermediate position of the control member.

A further object of my invention is in the provision of an electric motor, a control for said motor movable between two extreme positions, means, when said controller is in one extreme position, for closing a circuit through said motor to rotate the motor in one direction, means for opening said circuit when the motor has rotated a predetermined amount, means for closing another circuit when the controller is moved to the other extreme position to rotate the motor in the other direction, means for opening said circuit when the motor has rotated in this direction a predetermined amount, and means whereby the motor moves to a predetermined intermediate position when the controller is moved to any intermediate position.

Another object of my invention is in the provision of an air conditioning system with means for circulating air through a space to be conditioned, a condition responsive controller in the space movable between two extreme positions, a motor for controlling the amount of air circulated, and means for causing the motor to rotate in one direction a predetermined amount when the condition responsive means moves to one extreme position for permitting circulation of maximum amount of air, means for causing the motor to rotate in the other direction a predetermined amount when the condition responsive means is in the other extreme position for reducing the circulation of air to a minimum, and means for causing the motor to move to a predetermined intermediate position when the condition responsive means is in any intermediate position to allow the circulation of a predetermined amount of air less than the maximum.

Other objects and advantages will become apparent to those skilled in the art by referring to the accompanying specification, claims and drawing.

In the drawing, the single figure shows my improved control system as applied to a warm air heating plant.

A warm air heating furnace is indicated by the reference character 10 and includes a pipe 11 for conducting fuel thereto, warm air ducts 12, 12, a return air duct 13, a fan 14 for circulating air through the heating chamber of the furnace and the space to be heated, and a flue gas stack 15.

A valve indicated generally by the reference character 20 is provided for controlling the flow of fuel through the pipe 11. A valve stem 21 connected to the valve extends upwardly therefrom and is pivoted at 22 to an operating lever 23 which is in turn pivoted at 24 to a fixed member 25. To the other end of lever 23 is connected a cable 27 guided by pulleys 28 and 29 and in turn connected at 37 to an operating member 60. When lever 23 is raised upwardly the valve 20 is opened to permit flow of fuel through pipe line 11, the amount of fuel passing through the valve 20 being controlled by the extent of movement of the stem 21. Any suitable means as a spring (not shown) may be provided for biasing the valve towards closed position.

In the stack 15 is pivoted a damper 30 at 31, and to which is connected operating arm 32, and to the other end of arm 32 is connected by means of cable 34 a weight 33. Cable 34 is guided over pulleys 35, 36 and connected at 38 to the operating member 60. The weight 33 tends to pivot damper 30 to open position and said damper is moved to closed position by the operating member 60.

For driving the blower 14 a motor 40 is provided. This motor is connected to the blower by means of a belt 42 extending over pulleys 41, 43 of the motor and blower respectively. The motor is provided with terminals 44 and 45.

Mounted in the return air duct 13 is a damper 50 pivoted at 51. Secured to the damper is operating arm 52 on one end of which is mounted a mercury switch 53 having contacts 130 and 131 and to the other end of which arm is connected a weight 54 by means of cable 55. This cable passes over pulleys 56 and 36 and is connected at 38 to the operating member 60. The mercury switch 53 is arranged to be open when the damper 50 is moved to closed position, in which position the supply of air to the blower 14 is cut off. When the damper 50 moves to partially opened position as illustrated, the switch 53 is tilted to closed position as shown. This switch controls the flow of current to motor 40.

A motor generally indicated by the reference character 61 and shown in schematic form is provided for moving the operating member 60. This motor is of the condenser induction type and comprises an armature 62, field windings 63, 64 and a condenser 65. Windings 63 and 64 are connected together at one end and between the opposite ends of the windings is connected the condenser 65. The junction of the windings 63, 64 is permanently connected to the line 101. The opposite ends of the windings 63, 64 are selectively connected to the line 100 by means to be hereinafter described. When winding 64 is directly connected to the line 100, winding 63 is connected to said line through the condenser 65 and when the winding 63 is directly connected to the line, winding 64 is connected through the condenser 65 to the line. The current through the coil which is in series with the condenser leads the current through the other coil in phase and the direction of rotation of the armature 62 is dependent upon which winding is connected through the condenser to the line.

The armature shaft 66 has mounted thereon a pinion 67 connected through reduction gearing 68 to gear 69 mounted on shaft 70. Operating member 60 is mounted on shaft 70 whereby it is caused to rotate in one direction or the other in accordance with the direction of rotation of armature 62.

For controlling the direction of rotation of the motor, a relay generally indicated by the reference character 80 and comprising opposed balanced coils 81 and 82 and an armature 83 connected to a switch 84 movable into engagement with either contact 85 or 86 is provided. The coils 81, 82 are connected across a low tension coil 94 of step-down transformer 95. The high tension coil of the transformer is indicated by reference character 96 and is connected across lines 100, 101 which are in turn connected to a suitable source of power (not shown). Connected in parallel with the coils 81, 82 is a balancing potentiometer indicated generally by the reference character 110 which comprises a contact arm 111 and resistance 112. This potentiometer acts as a voltage divider for the coils 81, 82 and it will be apparent that when arm 111 is moved to the right the current through coil 81 will be greater than that through coil 82 and the armature 83 will be moved to the left, and when the contact arm moves to the left the current through coil 82 will become greater than that through 81 whereupon armature 83 will be moved toward the right.

A thermally responsive element 120 is mounted in the space being heated, this element comprising a bimetallic element 121 and a contact arm 122 moved thereby in response to temperature changes in the space. Connected to the coils 81, 82 are contacts, designated by the reference characters C and H, through protective resistances 105 and 106 respectively.

A second potentiometer designated by the reference character 130 and comprising a resistance 131 and a switch arm 150 is connected in parallel with the coils 81, 82 for a purpose to be hereinafter described.

It will be apparent that when the contact arm 122 of the thermostat 120 moves into engagement with contact C in response to a drop in temperature in the space, resistances 112 and 130 are shorted out from the circuit through coil 82 whereupon the current to this coil will be greater than that through coil 81, and when the contact arm moves into engagement with the contact marked H the current through coil 81 will exceed that through coil 82 whereupon armature 83 will be moved in one direction or the other depending upon which coil is more highly energized. The resistances 105 and 106 are provided to prevent a direct short-circuit across the transformer coil 94 as the arm 122 moves into engagement with contact C or H, when potentiometer arm 111 is in its corresponding extreme position.

Also mounted on shaft 70 is a member 180 formed of a suitable insulating material and provided to control the amount of rotation of armature 62 in either direction as described hereafter. Switches 71, 72 are connected to the motor in a manner to be hereinafter explained are opened by member 180 upon sufficient rotation in one direction or the other.

*Operation*

The parts are illustrated with the room thermostat in mid position, that is, it is neither calling for heat nor calling for shut-down of the heating system. Valve 20 is shown in partially closed position, dampers 30 and 50 are shown in mid position, that is, about half way between fully closed and fully open position. A circuit through the blower is established from line 100, contacts 130, 131 of switch 53, terminal 44 of the motor, through the motor, terminal 45 to line 101, whereby the motor causes the operation of the blower.

The arm 150 of potentiometer 130 is shown in mid position, that is, with the resistance on each side of the arm 150 being equal whereby these resistances have no effect on the current flowing through coils 81 and 82. For the present, therefore, the circuits through this potentiometer will be ignored in describing the operation of the system.

When the temperature in the space being heated by the furnace 10 drops to a predetermined value, arm 122 of the thermostat 120 is moved into engagement with the contact "C". Current through coil 82 of the relay flows as follows: from transformer coil 94 through conductor 140, resistance 105, conductors 143, 144, contact C, through the thermostat arm 122, and bimetallic element 121, conductor 149, conductor 170 through coil 82 and conductor 147 back to the coil 94. There will also be a current through coil 81 from the transformer coil 94 to conductor 140, coil 81, conductors 170, 149, 148, arm 111, resistance 112, conductor 142, resistance 106 to the coil 94. It is apparent that the current through coil 82 is greater than through coil 81, there being less resistance in series therewith, whereupon armature 83 is caused to move to the right moving with it switch arm 84 into engagement with contact 86. There will now be a flow of current through field winding 63 and motor 61 as follows: from line 100, conductor 160, switch arm 84, contact 86, conductor 161, switch 72, conductor 162, conductor 163 through winding 63, and conductor 164 to line 101. Current will also flow through condenser 65 and coil 64 as follows: from line 100, conductor 160, switch arm 84, contact 86, conductor 161, switch 72, conductor 162, condenser 65, winding 64 and conductor 164 to line 101. Since condenser 65 is connected in series with the winding 64 across the line, current through coil 64 leads current through coil 63 in phase and the armature 62 rotates in the direction of the arrow.

Operating member 60 is now moved in the direction of the arrow adjacent thereto by the motor 61 acting through reduction gearing 68 and causing valve 20 to be moved to wide open position by causing cable 27 to exert an upward pull on operating lever 23. The rotation of member 60 in clockwise direction permits weights 33 and 54 to move downwardly, thus moving dampers 30 and 50 to wide open position. The draft through stack 15 is thereby increased as is also the amount of air permitted to flow to the fan 14. The furnace is now functioning to furnish heat to the space being heated at a maximum rate.

Rotation of armature 62 also causes rotation of member 180 in a clockwise direction and after operating member 60 has moved a sufficient distance to open valve 20 and cause dampers 30 and 50 to move to wide open position this member 180 opens the switch 72 by engaging portion 73 thereof whereby the contacts of the switch are moved out of engagement with one another. The circuit through the motor previously described is now interrupted as will be apparent, and rotation of the motor ceases. Arm 111 of potentiometer 110 is moved by shaft 70 toward the right-hand end of resistance 112 and attempts to balance the flow of current through coils 81 and 82.

After sufficient heat has been supplied to the space being heated, arm 122 of the thermostat 120 moves out of engagement with contact C thus interrupting the previously described flow of current through coil 82. It will now be seen that the resistance in series with coil 82 is now greater than through coil 81 since arm 111 has moved to the right, whereby the resistance to the left thereof which is in series with said coil 82 is increased, and the flow of current through 81 is accordingly greater than through coil 82. Current through coil 81 flows as follows: from transformer coil 94, conductor 140, coil 81, conductor 170, conductors 149, 148, arm 111, the portion of the resistance to the right of arm 111, conductor 142, resistance 106, conductor 147 to coil 94. The current through the coil 82 flows from the transformer coil 94, conductor 140, resistance 105, conductor 141 through the resistance to the left of arm 111, through said arm, conductors 148, 149, 170, coil 82 back to the transformer coil 94. Since the current through coil 81 is now greater than through coil 82 armature 83 is urged toward the left, which, in turn, moves switch arm 84 into engagement with contact 85. Current now flows through the motor as follows: from line 100, conductor 160, switch arm 84, contact 85, conductor 165, switch 71, conductor 166 through winding 64, and conductor 164 to the line 101. Current also flows from the conductor 166 through the condenser 65, conductor 163, winding 63 and conductor 164 to the line 101. Winding 63 is now in series with the condenser 65 so that the armature 62 rotates in the direction opposite to that which it formerly rotated. The motor will continue rotation in this direction until the arm 111 which is driven by the motor through the reduction gearing 68 and shaft 70 moves back to the mid position, in which position the current through coils 81 and 82 becomes balanced, since the resistances in series therewith are now equal, whereupon armature 83 moves back to mid position, moving with it the switch arm 84 out of engagement with contact 85, thus breaking the circuit through the motor. The motor accordingly stops rotating with the parts in the position illustrated, valve 21 being partially closed and dampers 30 and 50 being partially closed, as illustrated, whereby the amount of heat being supplied to the space per unit time is reduced.

When the temperature in the space rises sufficiently so that bimetallic element 121 of the thermostat 120 causes arm 122 to engage the contact H, current through coil 81 becomes greater than that through coil 82 since the resistances 112 and 132 are shorted out from coil 81. The path of current through coil 81 is as follows: from transformer coil 94, conductor 140, coil 81, conductor 170, conductor 149 through the thermostat 120, arm 122, contact H, conductors 145, 146, resistance 106, conductor 147 to the transformer coil 94. The current through the coil 82 however flows through resistance 112 as follows: from the transformer coil 94 through conductor 140, resistance 105, conductor 141, resistance 112, arm 111, conductors 148, 149, 170, coil 82, conductor 147 to transformer coil 94. The armature 83 is accordingly again moved to the left moving switch arm 84 into engagement with contact 85. The motor again starts rotating in a counter-clockwise direction, the circuits through the motor being the same as those last described. The motor will continue rotating until member 180 engages arm 74 of switch 71 and causes said switch to open, thus breaking the circuit through the motor. When the motor has come to rest the operating member 60 has moved counter-clockwise to a point where the lever 23 is in its lowermost position whereupon the valve stem 21 is moved downwardly by its biasing means to effect the closing of the valve 20. Dampers 30 and 50 are caused to move to their closed positions, cables 34 and 55 being moved upwardly upon counter-clockwise movement of member 60. In this way the draft through the stack 15 is substantially cut off as is the flow of air through the return air duct 13. When said damper 50 is moved to its closed position, switch 53 which is moved therewith opens the circuit through contacts 130, 131 thus breaking the circuit to the blower motor 40. Thus when the room thermostat 120 is satisfied or is in the position where arm 122 engages contact H the blower motor is stopped, valve 20 is closed, stack 15 is closed, and the return air pipe 13 is closed.

The arm 111 has now been rotated by the shaft 70 to the left end of potentiometer 110. Therefore, when the temperature in the room falls below the value required to maintain arm 122 in engagement with contact H and resistance 112 is no longer shorted out the potentiometer 110 causes a greater amount of current to flow through coil 82 than flows through coil 81, since the resistance in series with coil 82 is less than that through coil 81. The circuit through coil 81 is now as follows: from transformer coil 94 through conductor 140, coil 81, conductors 170, 149, 148, arm 111 through the portion of the potentiometer resistance to the right of arm 111, to conductor 142, resistance 106, and conductor 147 to transformer coil 94. The current through coil 82 flows from transformer coil 94 through conductor 140, resistance 105, conductor 141, the portion of the resistance to the left of arm 111, arm 111, conductors 148, 149, 170, coil 82, conductor 147 to transformer coil 94. This increase in current through coil 82 now causes switch arm 84 to engage contact 86 whereupon current will flow through the motor in the same way as first described when the thermostat arm 122 engaged contact C. This movement will continue until arm 111 which is rotated with the shaft 70 again reaches a position in which the current through coils 81 and 82 is balanced. The valve 20 and dampers 30 and 50 are accordingly moved to the position shown in the drawing.

The potentiometer 130 is for the purpose of regulating the position at which the motor stops when the thermostat arm 122 is in engagement wtih neither contact C nor contact H. It will be understood that as arm 150 is moved to the right, for example, that arm 111 of potentiometer 110 will have to be moved to the left a corresponding amount in order that the current through coils 81 and 82 will become balanced. This change in position at which the arm 111 of potentiometer 110 causes the current through coils 81 and 82 to become balanced and causes the motor to stop will be accompanied by a similar change in position of member 60 when the motor is stopped. Therefore, the valve 20 and dampers 30 and 50 will not be as wide open as in the position illustrated.

Should the arm 150 of potentiometer 130 be moved to the left the arm 111 of potentiometer 110 will have to move to the right, a corresponding amount to balance the current through coils 81 and 82 and cause motor 61 to come to rest. In this case the valve 21 and dampers 30 and 50 will be opened more than they are now, when arm 122 of thermostat 120 is in engagement with neither contact C nor H.

It is therefore seen that with my apparatus I have devised a cycle of operation for a heating system wherein when the room thermostat moves to cold position the furnace is started at full capacity, and when the temperature rises above the cold setting of the thermostat but below the high setting thereof the furnace is run at an intermediate predetermined capacity regardless of the particular position of the thermostat arm between the cold and hot contacts thereof, and when the thermostat is completely satisfied the output of the furnace is at a minimum, starting again at the predetermined intermediate capacity as soon as the temperature falls below the high setting of the thermostat. It will be apparent that when the outside temperature is not severely cold, the furnace by running at intermediate capacity may furnish sufficient heat to raise the temperature of the space so that the room thermostat never reaches the cold position, and the furnace may not have to run at its full capacity.

While I have described and illustrated a preferred embodiment of my invention it is obvious that many changes may be made by those skilled in the art, and I wish it to be understood that my invention is to be limited only by the scope of the appended claims.

I claim as my invention:

1. In an air conditioning system, an air conditioning chamber, a fan for circulating air through said chamber and a space to be conditioned, means for operating said fan, adjustable damper means interposed in the system for controlling the amount of air flow, means operated by said damper for causing operation of said fan operating means when said damper is in intermediate or wide open position and for stopping operation of said fan when said damper is in closed position, condition responsive means movable between two extreme positions, means responsive to movement of said condition responsive means to one extreme position to move said damper to a position permitting maximum flow of air through the system, means responsive to movement of said condition responsive means to the other extreme position to move said damper to a position permitting minimum flow of air through the system and stopping operation of said fan, and means responsive to movement of said condition responsive means to any intermediate position to cause movement of said damper to a predetermined intermediate position, in which position said fan is caused to operate.

2. In a heating system, a warm air furnace having a heating chamber, a warm air duct, a return air duct and an outlet stack, means controlling the supply of fuel to said furnace, a stack damper for controlling the draft through the stack, fan means for circulating air through the heating chamber, warm air duct, a space to be heated and the return air duct, damper means for controlling the amount of air circulated, temperature responsive means in the space to be heated movable between two extreme positions, a single motor responsive to movement of the temperature responsive means to one extreme position to move the various controlling means simultaneously to positions wherein there is a maximum supply of fuel to the furnace, a maximum draft through the stack and a maximum flow of air through the system, means responsive to movement of the temperature responsive means to its other extreme position simultaneously to move the various controlling means to positions wherein there is a minimum supply of fuel to the furnace, a minimum draft through the stack and a minimum flow of air through the system, means responsive to movement of the temperature responsive means to any intermediate position simultaneously to move each of the controlling means to predetermined intermediate positions and single means for adjusting the predetermined intermediate positions of each of the controlling means.

3. In a heating system, air heating means including a heating chamber, means for heating said chamber, a fan for circulating air through said chamber and a space to be heated, means for operating said fan, adjustable damper means interposed in the system for controlling the amount of air flow, temperature responsive means in the space to be heated movable between two extreme positions, means responsive to movement of said temperature responsive means to a first extreme position for causing a maximum amount of heat to be supplied to said heating chamber and to move said damper to a position permitting maximum flow of air through the system, means responsive to movement of said temperature responsive means to a second extreme position for causing a minimum amount of heat to be supplied to said heating chamber and to move said damper to a position permitting minimum flow of air through the system, means responsive to movement of said temperature responsive means to any intermediate position for causing a predetermined intermediate amount of heat to be supplied to said heating chamber and for causing movement of said damper to a predetermined intermediate position, and means operative substantially at the time of movement of said damper to the position permitting minimum flow of air through the system for stopping operation of said fan.

ARTHUR C. GRANT.